US009689488B2

(12) United States Patent
Youn et al.

(10) Patent No.: US 9,689,488 B2
(45) Date of Patent: Jun. 27, 2017

(54) INTEGRATED APPARATUS FOR DETECTING GEAR SHIFTING

(71) Applicant: SL Corporation, Daegu (KR)

(72) Inventors: Sug Jun Youn, Gyeongsangbuk-Do (KR); Kin Yeong Ko, Gyeonsangbuk-Do (KR)

(73) Assignee: SL Corporation, Daegu (KR)

( * ) Notice: Subject to any disclaimer, the term of this patent is extended or adjusted under 35 U.S.C. 154(b) by 362 days.

(21) Appl. No.: 14/059,201

(22) Filed: Oct. 21, 2013

(65) Prior Publication Data

US 2014/0123797 A1 May 8, 2014

(30) Foreign Application Priority Data

Nov. 6, 2012 (KR) .......................... 10-2012-0125072

(51) Int. Cl.
*F16H 59/02* (2006.01)
(52) U.S. Cl.
CPC . *F16H 59/0204* (2013.01); *F16H 2059/0239* (2013.01); *Y10T 74/2014* (2015.01)
(58) Field of Classification Search
CPC ............. F16H 59/0204; F16H 59/0226; F16H 59/0239; F16H 59/044; F16H 2059/0221; B60K 20/00; B60K 20/02; B60K 20/04; H01H 36/0033; H01H 36/02; H01H 2071/048
USPC ... 74/473.18, 473.3, 473.33, 473.36, 473.31, 74/473.335; 324/207.2, 207.22, 207.23; 341/15; 180/336

See application file for complete search history.

(56) References Cited

U.S. PATENT DOCUMENTS

| 5,406,860 | A | * | 4/1995 | Easton | F16H 59/02 74/335 |
| 5,584,209 | A | * | 12/1996 | Issa | F16H 59/0204 200/61.88 |
| 5,913,935 | A | * | 6/1999 | Anderson | F16H 59/0204 74/335 |
| 6,000,296 | A | * | 12/1999 | Sundquist | B60K 20/04 180/233 |

(Continued)

FOREIGN PATENT DOCUMENTS

| JP | 2004-207144 A | 7/2004 |
| JP | 2004-210251 A | 7/2004 |

(Continued)

*Primary Examiner* — Terence Boes
*Assistant Examiner* — Bobby Rushing, Jr.
(74) *Attorney, Agent, or Firm* — Mintz Levin Cohn Ferris Glovsky and Popeo, P.C.; Kongsik Kim; Carolina Säve

(57) ABSTRACT

An integrated apparatus for detecting a gear shifting is provide that has a switch and a gear shifting detection controller for detecting a sports mode of a vehicle that are integrally implemented. The apparatus is configured to detect whether the mode is converted in to the sports mode based on a non-contact recognition manner. Therefore, production and assembly processes are simplified for providing the gear shifting detection controller and the switch to a gear shifting detection configuration, thereby reducing production costs, minimizing noise generated when a general gear shifting mode is converted into the sports mode, or the sports mode is converted into the general gear shifting mode. In addition, a lifespan of the switch configured to detect whether the mode is converted into the sports mode is increased.

6 Claims, 4 Drawing Sheets

(56) References Cited

U.S. PATENT DOCUMENTS

| | | | | |
|---|---|---|---|---|
| 7,472,621 | B2* | 1/2009 | Syamoto | F16H 59/0204 74/473.18 |
| 7,568,404 | B2* | 8/2009 | Grossman | F16H 59/0204 74/473.21 |
| 7,750,624 | B2* | 7/2010 | Heo | F16H 59/0204 324/207.23 |
| 8,560,194 | B2* | 10/2013 | Kim | B60K 20/02 180/332 |
| 9,169,918 | B2* | 10/2015 | Choi | F16H 59/0204 |
| 2008/0148894 | A1* | 6/2008 | Rapin | F16H 59/0204 74/473.21 |
| 2012/0187940 | A1* | 7/2012 | Uhlenbruck | F16H 59/0204 324/207.11 |

FOREIGN PATENT DOCUMENTS

| | | | |
|---|---|---|---|
| JP | 2007-045390 A | 2/2007 | |
| KR | 10-2011-0024518 A | 3/2011 | |
| KR | 10-2011-0062335 A | 6/2011 | |
| KR | 10-1095020 B1 | 12/2011 | |
| KR | 10-2012-0060095 A | 6/2012 | |
| KR | 101336612 B1 * | 12/2013 | ......... F16H 59/0204 |

\* cited by examiner

INTEGRATED APPARATUS FOR DETECTING GEAR SHIFTING

CROSS-REFERENCE TO RELATED APPLICATION

This application claims priority to Korean Patent Application No. 10-2012-0125072 filed on Nov. 6, 2012, the contents of which in its entirety are herein incorporated by reference.

BACKGROUND

The present invention relates to an integrated apparatus for detecting a gear shift, and more particularly, to an integrated apparatus for detecting a gear shift in which a switch and a gear shifting detection controller that detects a sports mode of a vehicle are integrally implemented.

A gear shifting controller is an apparatus that is installed between a clutch and a propeller shaft and appropriately changes power of an engine based on a variation of a vehicle driving state, and is provided with a gear shifting manipulation mechanism that allows the gear shifting controller to be operated by a manipulation of a driver.

In a manual transmission, a gear shifting detection controller is mounted to provide a gear shift feel of an automatic transmission, and the gear shifting detection controller refers to a technology that provides both improved fuel efficiency and a sport mode driving performance of the manual transmission, and driving convenience and smoother gear shifting performance of the automatic transmission.

The gear shifting detection controller may be divided into a wet type and a dry type. First, in the wet type, a clutch drum is disposed, which has a structure similar to a structure of a wet type multiple plate switch used in the automatic transmission, at an input end side of the gear shifting controller, and is configured to transmit or block power to allow power of an engine to be used as an input of the gear shifting controller.

However, in the dry type, an outer clutch that has a substantially large effective radius and two inner clutches having a small radius are disposed to be parallel to each other in a structure similar to a clutch of the gear shifting controller, and when first, third, and fifth speed stages (odd number stages) are driven, the outer clutch is directly connected, and when second, fourth, and sixth speed stages (even number stages) are driven, the inner clutch is directly connected, to transmit or block power to allow power of the engine to be used as an input of the gear shifting controller.

Meanwhile, the automatic transmission transmits power using the oil in the transmission, and thus generally has lower fuel efficiency due to higher energy loss than the manual transmission that has direct power transmission mechanism between gears.

To supplement the drawbacks of the automatic transmission, a sports mode gear shifting stage (e.g., M gear shifting stage) in which a shift lever is manipulated in a sports mode in a vertical manner is separately provided in addition to a main gear shifting stage that includes a parking stage (P), a reversing stage (R), a neutral stage (N), and a driving stage (D).

When the gear shifting stage is converted into the sports mode gear shifting stage by a shift lever manipulation of the driver, a method of detecting that the gear shifting stage is converted into the sports mode gear shifting stage is implemented using a switch that is operated together with one side of a lower end of the shift lever. In addition, a gear shifting detection controller and a switch, among configurations for detecting gear shifting in the related art, share inherent component characteristics in that the gear shifting detection controller and the switch are operated in the sports mode, but the gear shifting detection controller and the switch are separately provided. Accordingly, bracket bases that accommodate, respectively, the gear shifting detection controller and the switch may be more complex, connectors and wires may be required to transmit signals in relation to the gear shifting detection controller and the switch, and insert injection molded components for coupling the gear shifting detection controller and the switch may be required.

Therefore, in the related art, production cost may increase due to production and assembly processes for providing the gear shifting detection controller and the switch to the configuration for detecting a gear shifting may be complex. Furthermore, since the switch of the related art for detecting whether the mode is converted into the sports mode selectively accommodates a protrusion positioned at one side of the shift lever based on movement of the position of the shift lever, a guide structure inside a coupling aperture for accommodating the protrusion and the accommodated protrusion come into contact with each other, and contact noise may occur between the guide structure and the protrusion.

SUMMARY

The present invention provides an integrated apparatus for detecting a gear shift in which a switch and a gear shifting detection controller that detects a sports mode of a vehicle may be integrally implemented.

In addition, the present invention provides an integrated apparatus for detecting a gear shift that detects whether a mode is converted into the sports mode based on a non-contact recognition manner.

The objects of the present invention are not limited to the aforementioned object, and other objects, which are not mentioned above, will be apparently understood by the person skilled in the art from the following description.

An exemplary embodiment of the present invention provides an integrated apparatus for detecting a gear shift, including: a switch configured to output whether intensity of a magnetic field is detected, wherein the magnetic field may be generated from a shift lever based on movement of the position of the shift lever, and configured to determine whether to select a gear shifting stage of a sports mode; and a gear shifting detection controller configured to output a result for specifying the gear shifting stage based on a position movement direction and a position movement width by a lower end linkage shaft protrusion of the shift lever.

The intensity of the magnetic field generated from the shift lever may be generated from a first magnet positioned at an end portion of an upper end linkage shaft protrusion positioned at an upper end of the shift lever. The switch may include a first hall sensor configured to detect the intensity of the magnetic field generated from the first magnet. In addition, the upper end linkage shaft protrusion may protrude to be oriented toward a position of the first hall sensor.

When the gear shifting stage of the sports mode is selected, the intensity of the magnetic field generated from the first magnet may be set to an intensity at which the magnetic field is able to be transmitted in a spaced distance between the end of the upper end linkage shaft protrusion and the first hall sensor.

The integrated apparatus for detecting a gear shifting may further include an electronic controller configured to determine a gear shift based on the output result provided from one or more of the switch and the gear shifting detection controller, in which the electronic controller may be configured to determine that the gear shifting stage of the sports mode is selected when the output result from the switch is converted from a state in which the intensity of the magnetic field is not detected into a state in which the intensity of the magnetic field is detected. Further, the electronic control unit may be configured to determine that the gear shifting stage of the sports mode is released when the output result from the switch is converted from a state in which the intensity of the magnetic field is detected into a state in which the intensity of the magnetic field is not detected.

The gear shifting detection controller may include a rotating member configured to be operated with respect to a position movement direction and a position movement width by the lower end linkage shaft protrusion of the shift lever, a second magnet disposed at one side of the rotating member, and a second hall sensor configured to detect the intensity of the magnetic field generated by the second magnet. The second hall sensor may be disposed in a region where the detection for the intensity of the magnetic field generated by a rotation direction and a rotation amount of the second magnet is maintained at a predetermined ratio or greater. At least one second hall sensor may be disposed in the region.

Another exemplary embodiment of the present invention provides an integrated apparatus for detecting a gear shifting, including a gear shifting detection controller which may include: a rotating member configured to be operated with respect to a position movement direction and a position movement width by a lower end linkage shaft protrusion of a shift lever, a magnet disposed at one side of the rotating member; and a hall sensor configured to detect intensity of the magnetic field generated by the magnet, wherein when a gear shifting stage, which is specified by a position movement of the shift lever, is divided into a sports mode or an auto-mode, the position movement direction and the position movement width of the gear shifting detection controller by the lower end linkage shaft protrusion of the shift lever may be changed to correspond to the divided sports mode or auto-mode.

The integrated apparatus for detecting a gear shifting may further include a switch configured to output whether intensity of a magnetic field is detected, wherein the magnetic field may be generated from the shift lever based on movement of the position of the shift lever, and configured to determine whether to select a gear shifting stage of a sports mode. The intensity of the magnetic field generated from the shift lever may be generated from a first magnet positioned at an end portion of an upper end linkage shaft protrusion positioned at an upper end of the shift lever. The switch may include a first hall sensor configured to detect the intensity of the magnetic field generated from the first magnet. The upper end linkage shaft protrusion may protrude to be oriented toward a position of the first hall sensor.

When the gear shifting stage of the sports mode is selected, the intensity of the magnetic field generated from the first magnet may be set to an intensity at which the magnetic field is able to be transmitted in a spaced distance between the end of the upper end linkage shaft protrusion and the first hall sensor.

Therefore, in the present invention, a switch and a gear shifting detection controller for detecting a sports mode of a vehicle may be integrally implemented, and whether the mode is converted into the sports mode may be detected based on a non-contact recognition manner, and thus it may be possible to simplify production and assembly processes for providing the gear shifting detection controller and the switch to a gear shifting detection configuration, thereby reducing production costs, minimizing noise generated when a general gear shifting mode is converted into the sports mode, or the sports mode is converted into the general gear shifting mode, and increasing a lifespan of the switch configured to detect whether the mode is converted into the sports mode.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

Figure 1:
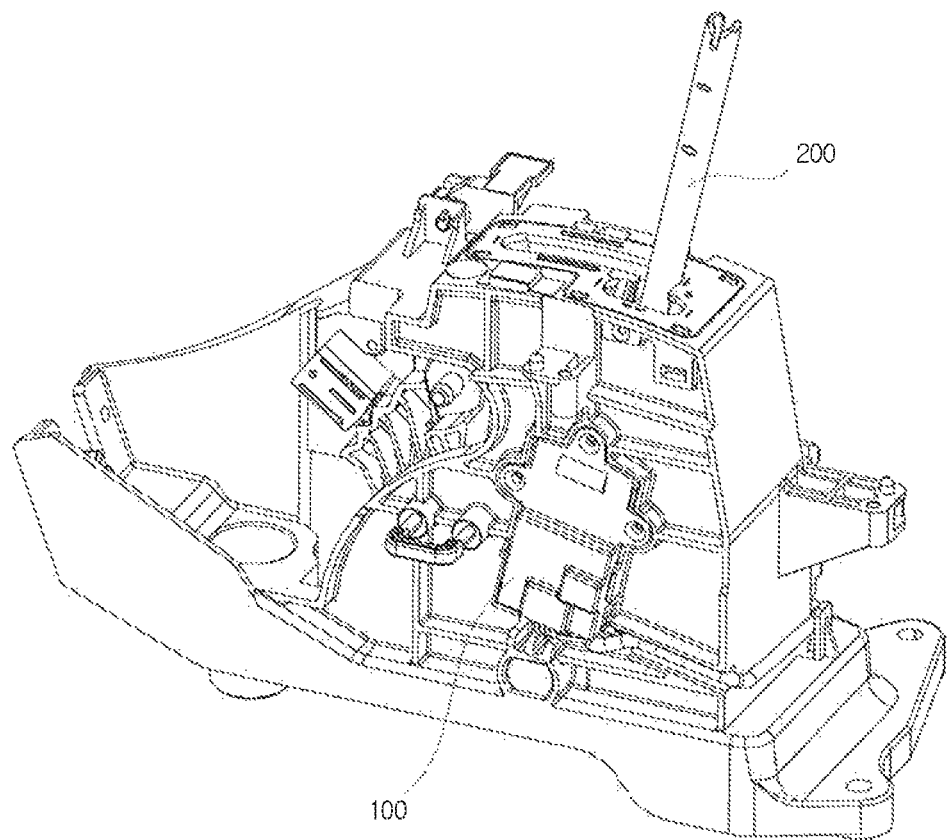
FIG. 1 is an exemplary view illustrating a front state in which an integrated apparatus for detecting a gear shifting according to an exemplary embodiment of the present invention is mounted.

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these exemplary embodiments are provided so that this disclosure will be thorough and complete and will fully convey the concept of the invention to those skilled in the art, and the present invention will only be defined by the accompanying claims. Like reference numerals refer to like elements throughout the specification.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Embodiments are described herein with reference to cross-section illustrations that are schematic illustrations of exemplary embodiments (and intermediate structures). As such, variations from the shapes of the illustrations as a result, for example, of manufacturing techniques and/or tolerances, are to be expected. Thus, these exemplary embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Hereinafter, an exemplary embodiment of the present invention will be described in detail with reference to the accompanying drawings.

Figure 2:
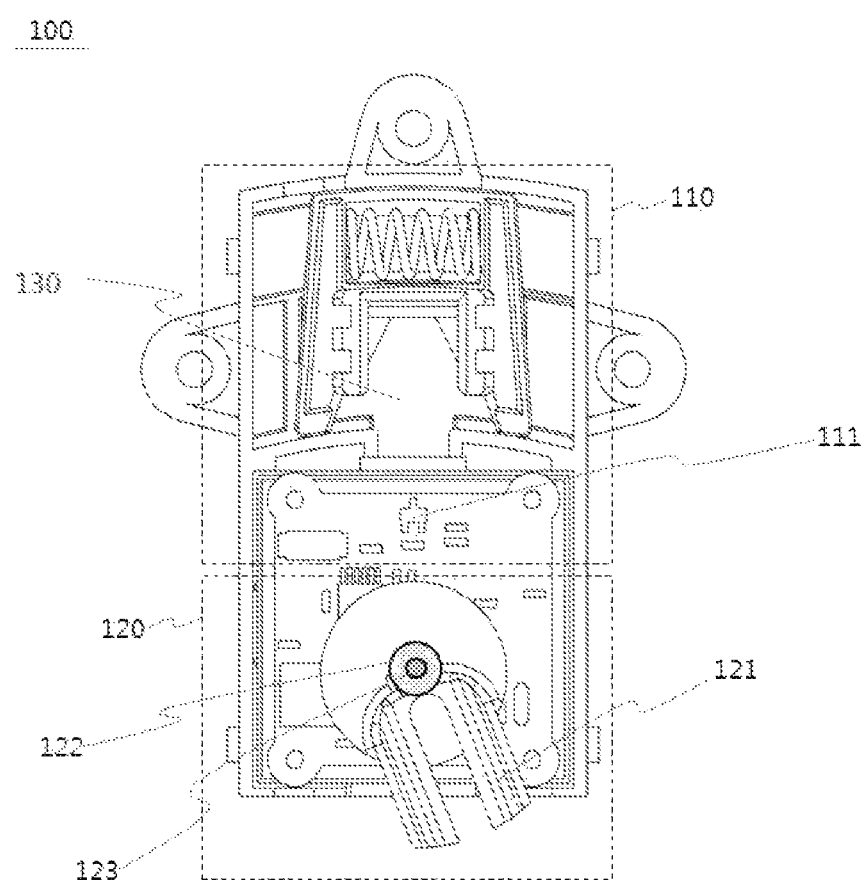
FIG. 2 is an exemplary view illustrating a rear structure in which the integrated apparatus for detecting a gear shifting, which is illustrated in FIG. 1, is mounted according to an exemplary embodiment of the present invention.
Figure 3:
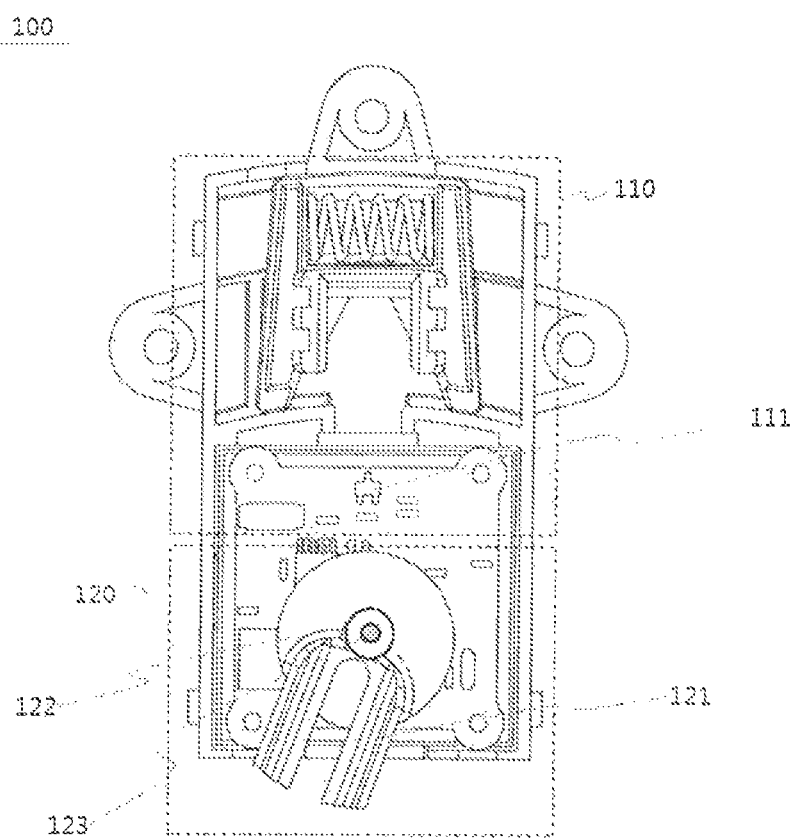
FIG. 3 is an exemplary view illustrating an interior structure of the integrated apparatus for detecting a gear shifting which is illustrated in FIG. 1 according to an exemplary embodiment of the present invention.
Figure 4:
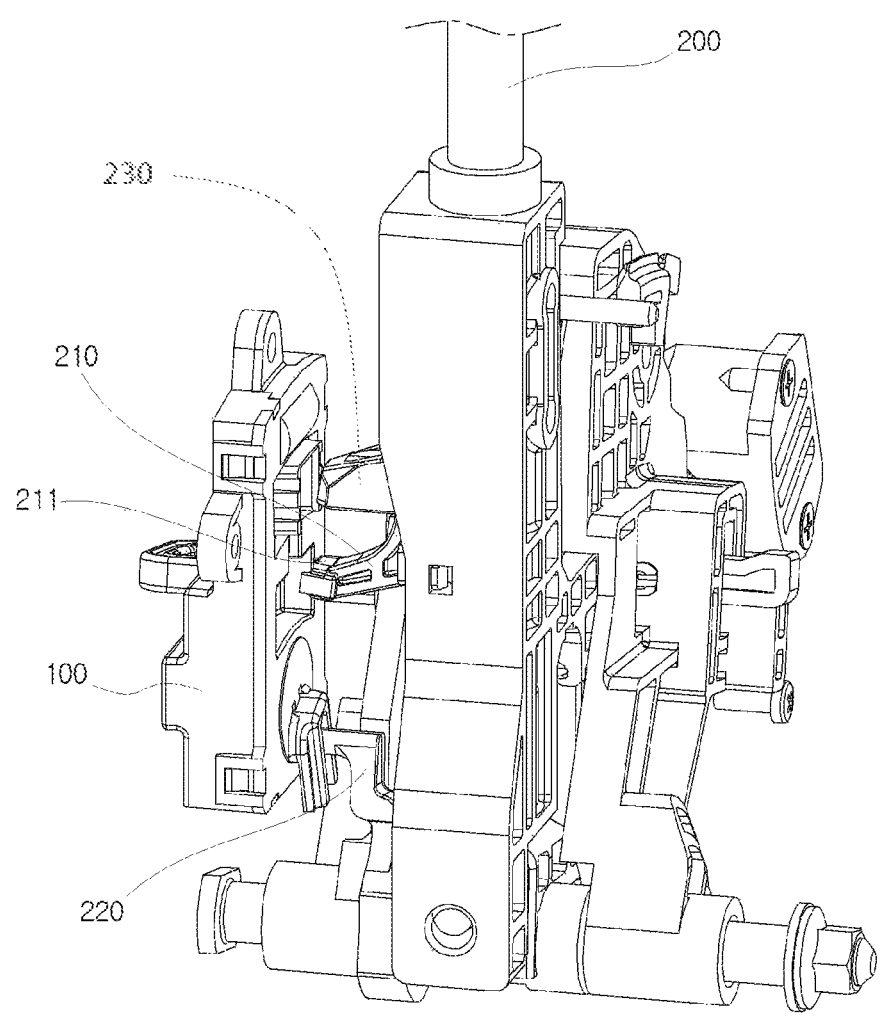
FIG. 4 is an exemplary view illustrating an interior structure of the integrated apparatus for detecting a gear shifting which is illustrated in FIG. 1 according to another exemplary embodiment of the present invention.

FIG. 1 is an exemplary view illustrating a front state in which an integrated apparatus 100 for detecting a gear shifting according to an exemplary embodiment of the present invention is mounted, FIG. 2 is an exemplary view illustrating a rear structure in which the integrated apparatus 100 for detecting a gear shifting, which is illustrated in FIG. 1 is mounted, and FIGS. 3 and 4 are exemplary views illustrating exemplary embodiments of an interior structure of the integrated apparatus 100 for detecting a gear shifting which is illustrated in FIG. 1. As illustrated, the integrated apparatus 100 for detecting a gear shifting may include a switch 110 and a gear shifting detection controller 120 integrated in a single controller.

When a position of a shift lever 200 is moved to a gear shifting stage of a sports mode that manually shifts gears vertically in addition to a main gear shifting stage including a parking stage (P), a reversing stage (R), a neutral stage (N), and a driving stage (D), the switch 110 may be configured to detect that the gear shifting stage is changed to the gear shifting stage of the sports mode while being operated together with motion of the shift lever 200.

Thereafter, the switch 110 may be configured to transmit to an electronic controller gear shifting stage detection information based on the detection of the change of the gear shifting stage to the gear shifting stage of the sports mode. Specifically, the switch 110 may be fixed to one side of a lower portion of the shift lever 200, which may be manipulated by a user to shift gears, and may be provided in a shape that stands in a vertical direction of the shift lever 200. In particular, the switch 110 may be fixed and positioned within a region where the switch 110 may detect the relative movement of the position of the shift lever 200, and specifically, the position of the shift lever 200 may not be moved forward/rearward (e.g., horizontally) to specify the main gear shifting stage including the parking stage (P), the reversing stage (R), the neutral stage (N), and the driving stage (D), but may be fixed and positioned in the region where the switch 110 may detect whether a gear shifting position is changed to the side, to specify the gear shifting stage of the sports mode instead of the main gear shifting stage.

In other words, when the position of the shift lever 200 is changed to the gear shifting position for specifying the gear shifting stage of the sports mode, the position of the shift lever 200 may be moved to the gear shifting position for specifying the gear shifting stage of the sports mode to cause a position of an upper end linkage shaft protrusion 210, which is formed at one side of the lower portion of the shift lever 200, to be moved in the same direction.

The upper end linkage shaft protrusion 210 may include a first magnet 211 to allow the switch 110 to detect that the shift lever 200 is positioned at the gear shifting position for specifying the gear shifting stage of the sports mode in a non-contact recognition manner. A position of the first magnet 211 may be disposed at an end side of the upper end linkage shaft protrusion 210.

When the upper end linkage shaft protrusion 210, which may be moved together with the movement of the position of the shift lever 200 for specifying the gear shifting stage of the sports mode, is positioned in a predetermined detection possible region, the switch 110 may be configured to respond to intensity of a magnetic field of the first magnet 211 included in the upper end linkage shaft protrusion 210. In other words, the switch 110 may include a first hall sensor 111 to detect the intensity of the magnetic field of the first magnet 211. The first hall sensor 111 in the switch 110 may be disposed at a position where magnetic field may be detected with respect to the detection possible region, and for example, the first hall sensor 111 may be disposed at a region in the switch 110 in which the first hall sensor 111 may be equipped at a minimum distance from the first magnet 211 that is positioned in the detection possible region.

The detection of the intensity of the magnetic field of the first magnet 211 using the first hall sensor 111 may mean the detection of the change of the position of the shift lever 200 to the gear shifting stage of the sports mode. When the intensity of the magnetic field of the first magnet 211 is detected, the first hall sensor 111 may be configured to transmit the detected sensor signal to the electronic controller. In addition, the upper end linkage shaft protrusion 210 may not be formed at one side of the lower portion of the shift lever 200. In other words, the aforementioned example is possible by attaching the first magnet 211 to one side of the lower portion of the shift lever 200, forming a protrusion, which corresponds to the shape of the upper end linkage shaft protrusion 210, from the switch 110, and then providing the first hall sensor 111 at an end of the formed protrusion.

When the position of the shift lever 200 is changed to the gear shifting position for specifying the gear shifting stage of the sports mode, the position of the shift lever 200 may be moved to the gear shifting position for specifying the gear shifting stage of the sports mode to cause a position of the first magnet 211, which is formed at one side of the lower portion of the shift lever 200, to be moved in the same direction.

When the first magnet 211, which is moved together with the movement of the position of the shift lever 200 for specifying the gear shifting stage of the sports mode, is positioned in a predetermined detection possible region, the first hall sensor 111 of the switch 110 may be configured to respond to the intensity of the magnetic field of the first magnet 211. The detection possible region may be a peripheral region based on the protrusion of the switch 110.

In addition, when selecting the gear shifting stage of the sports mode, to provide a grip feeling to a driver when the shift lever 200 is moved to a neutral control position in the gear shifting stage of the sports mode after performing a '+' gear shift or a '−' gear shift with respect to the gear shifting stage of the sports mode, the switch 110 may have a coupling aperture 130 which selectively accommodates a predetermined shaft 230 the shift lever 200 in relation to the '+' gear shifting or the '−' gear shifting with respect to the gear shifting stage of the sports mode. In other words, when the '+' gear shift or the '−' gear shift with respect to the gear shifting stage of the sports mode is performed after selecting the gear shifting stage of the sports mode and when the predetermined shaft 230 of the shift lever 200 is inserted into the coupling aperture 130 to provide the predetermined grip feeling to the driver, restraining forces may occurs against the predetermined shaft 230 of the shift lever 200, which is inserted into the coupling aperture 130, by elastic repulsive force of an elastic member in the coupling aperture 130.

The gear shifting detection controller 120 may be configured to more accurately provide information regarding a type of gear shifting selected by the driver in a manipulation state of the shift lever 200, to the electronic controller. For example, the gear shifting detection controller 120 may include a DCT (double clutch transmission).

In addition, the gear shifting detection controller 120 may be implemented as a structure implemented in the form of a single controller together with the aforementioned switch 110. First, a configuration will be described in which the gear shifting detection controller 120 may obtain information regarding a type of gear shift from a manipulation state of the shift lever 200.

When the shift lever 200 is operated to the main gear shifting stage including the parking stage (P), the reversing stage (R), the neutral stage (N), and the driving stage (D), or when the shift lever 200 is operated to perform a vertical gear shift at the gear shifting stage of the sports mode capable of manually shifting gears, a position of a lower end linkage shaft protrusion 220, which is formed at another side of the lower portion of the shift lever 200, may also be moved. The movement of the position of the lower end linkage shaft protrusion 220 may be caused by the movement of the position of the shift lever 200, and therefore the position of the lower end linkage shaft protrusion 220 may be moved forward/rearward (e.g., horizontally) based on the forward/rearward movement of the position of the shift lever 200.

Referring to the illustrated configuration, the movement of the position of the lower end linkage shaft protrusion 220 means the movement of the position of the shift lever 200 in a forward/rearward direction, but in particular, observing the movement of the position of the lower end linkage shaft protrusion 220 in view of the side thereof, the position of the lower end linkage shaft protrusion 220 may be moved along a rotation trajectory, which forms an arc within an angle in a predetermined range, in consideration with a linkage structure with the gear shifting detection controller 120. In other words, the gear shifting detection controller 120 may have a rotating member 121 to cause the position of the gear shifting detection controller 120 to be moved together with (e.g., correspond to) the movement of the position of the lower end linkage shaft protrusion 220.

The rotating member 121 may be formed in a shape that includes a substantially straight slot of which one side may be open, and by fitting the lower end linkage shaft protrusion 220 into the open one side of the straight-line-shaped slot, the rotating member 121 and the lower end linkage shaft protrusion 220 may be coupled to each other. In other words, the lower end linkage shaft protrusion 220 may remain coupled to the rotating member 121.

Thereafter, the position of the lower end linkage shaft protrusion 220 may also be moved along the aforementioned rotation trajectory that corresponds to the gear shifting stage designated by the shift lever 200, to cause the position of the rotating member 121 to also be moved in the same direction and along the same rotation trajectory as the rotation trajectory along which the position of the lower end linkage shaft protrusion 220 is moved.

In addition, a second magnet 122 may be formed at any one side of the rotating member 121, and the rotation trajectory with respect to a specific direction of the rotating member 121 may directly lead to the movement of the position of the second magnet 122.

Furthermore, a second hall sensor 123 may be disposed within a region in which the rotation trajectory of the rotating member 121 is formed, such that when the position of the second magnet 122 is moved in the detection possible region of the second hall sensor 123, the second hall sensor 123 may be configured to detect the intensity of the magnetic field of the second magnet 122. In particular, the second hall sensor 123 may have a structure configured to detect the intensity of the magnetic field generated by the rotation of the second magnet 122. The above structure may be a method of allowing a size of the gear shifting detection controller 120 to be compact. In other words, it may be efficient to detect the magnetic field when the second hall sensor 123 is positioned in a region where the intensity of the magnetic field generated by the rotation of the second magnet 122 becomes a maximum, and thus, the second hall sensor 123 may be disposed at an upper side or a lower side of the second magnet 122 based on a plane on which the second magnet 122 is disposed.

For example, when the second hall sensor 123 is disposed at the upper side of the second magnet 122, the second hall sensor 123 may be configured to detect the intensity of the magnetic field provided from the second magnet 122 when the rotating member 121 is rotated in a clockwise direction. In addition, the second hall sensor 123 may be configured to detect the intensity of the magnetic field, which is provided from the second magnet 122 when the rotating member 121 is rotated in the clockwise direction, by setting the direction to be a different direction of the magnetic field.

As another example, when the second hall sensor 123 is disposed at the lower side of the second magnet 122, the second hall sensor 123 may be configured to detect the intensity of the magnetic field provided from the second magnet 122 when the rotating member 121 is rotated in a counterclockwise direction. In addition, the second hall sensor 123 may be configured to detect the intensity of the magnetic field, which is provided from the second magnet 122 when the rotating member 121 is rotated in the counterclockwise direction, by setting the direction to be a different direction of the magnetic field.

Furthermore, the second hall sensor 123 may be disposed at both the upper side and the lower side of the second magnet 122 to include a configuration for more precisely determining the intensity and the direction of the magnetic field of the second magnet 122. The detection of the intensity of the magnetic field of the second magnet 122 by using the second hall sensor 123 means that a type of main gear shifting stage that is manipulated, or a vertical gear shifting performed by the gear shifting stage of the sports mode may be detected, and when the intensity of the magnetic field of the second magnet 122 is detected, the second hall sensor 123 may be configured to transmit the detected sensor signal to the electronic controller.

For example, when the rotating member 121 is rotated in the clockwise direction by about 5°, the first gear shifting stage may be set, when the rotating member 121 is rotated in the clockwise direction by about 10°, the second gear shifting stage may be set, and when the rotating member 121 is rotated in the clockwise direction by about 15°, the third gear shifting stage may be set.

As another example, when the rotating member 121 is rotated in the counterclockwise direction by about 15°, the third gear shifting stage may be set, when the rotating member 121 is rotated in the counterclockwise direction by about 10°, the second gear shifting stage may be set, and when the rotating member 121 is rotated in the counterclockwise direction by about 5°, the first gear shifting stage may be set.

In yet another example, when a reference position of the rotating member 121 is about 10°, the second gear shifting stage may be set when the rotating member 121 is positioned at about 10°, the first gear shifting stage may be set when the rotating member 121 is rotated in the clockwise direction by about 5°, and the third gear shifting stage may be set when the rotating member 121 is rotated in the counterclockwise direction by about 5°.

In addition, since the present invention provides the integrated apparatus for detecting a gear shifting, in which the switch and the gear shifting detection controller for detecting the sports mode of the vehicle may be integrally implemented, the present invention may be apparently and practically implemented, and therefore the present invention may be industrially applicable.

The foregoing is illustrative of the present invention and is not to be construed as limiting thereof. Although a few exemplary embodiments of the present invention have been described, those skilled in the art will readily appreciate that many modifications are possible in the embodiments without materially departing from the novel teachings and advantages of the present invention. Accordingly, all such modifications are intended to be included within the scope of the present invention as defined in the claims. Therefore, it is to be understood that the foregoing is illustrative of the present invention and is not to be construed as limited to the exemplary embodiments disclosed, and that modifications to the disclosed embodiments, as well as other embodiments, are intended to be included within the scope of the accompanying claims. The present invention is defined by the following claims, with equivalents of the claims to be included therein.

What is claimed is:
1. A shift lever device, comprising:
   a shift lever configured to move in a gear shifting mode and a sports mode, wherein the shift lever includes an upper end linkage shaft protrusion, a lower end linkage shaft protrusion, and a predetermined shaft;
   a first magnet disposed at one side of the upper end linkage shaft protrusion of the shift lever;

an integrated apparatus configured to detect a position of the shift lever, wherein the integrated apparatus includes a switch and a gear shifting detection controller formed as a unit, wherein the switch includes an elastic member that provides restraining force to the predetermined shaft when the shift lever moves in the sports mode and a first hall sensor configured to detect a first magnetic field generated from the first magnet when the shift lever moves in the sports mode, wherein the gear shifting detection controller includes a rotating member that is moved together with the lower end linkage shaft protrusion and a second hall sensor configured to detect a second magnetic field generated from a second magnet disposed at the rotating member; and wherein the upper end linkage shaft protrusion, lower end linkage shaft protrusion, and the predetermined shaft are disposed in a same direction toward the integrated apparatus.

2. The shift lever device of claim 1, wherein the integrated apparatus includes an aperture, wherein the upper end linkage shaft protrusion and the predetermined shaft protrude to be oriented toward the aperture of the integrated apparatus, and wherein the upper end linkage shaft protrusion and the predetermined shaft are inserted into the aperture when the shift lever moves to the sports mode.

3. The shift lever device of claim 1, wherein the magnetic field generated from the first magnet is set to be detected by the first hall sensor when the sports mode is selected.

4. The shift lever device of claim 1, further comprising:
a controller configured to determine a gear shifting stage based on the output result provided from one or more of the switch and the gear shifting detection controller,
wherein the controller is configured to determine that the gear shifting stage of the sports mode is selected when the magnetic field of the first magnet is detected by the first sensor.

5. The shift lever device of claim 4, wherein the controller is configured to determine that the gear shifting stage of the sports mode is released when the magnetic field of the first magnet is not detected by the first sensor.

6. The shift lever device of claim 1, wherein the rotating member is configured to be operated with respect to the position movement and the position movement of a width direction by the lower end linkage shaft protrusion of the shift lever.

* * * * *